(12) United States Patent
Barkan et al.

(10) Patent No.: US 10,924,462 B2
(45) Date of Patent: *Feb. 16, 2021

(54) CRYPTANALYSIS METHOD AND SYSTEM

(71) Applicant: Elad Barkan, Kfar Sirkin (IL)

(72) Inventors: Elad Barkan, Kfar Sirkin (IL); Eli Biham, Haifa (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/566,917

(22) Filed: Sep. 11, 2019

(65) Prior Publication Data

US 2020/0112547 A1    Apr. 9, 2020

Related U.S. Application Data

(63) Continuation of application No. 15/859,795, filed on Jan. 2, 2018, now Pat. No. 10,447,666, which is a (Continued)

(30) Foreign Application Priority Data

Apr. 30, 2003 (IL) .......................... 155671

(51) Int. Cl.
*H04L 9/00* (2006.01)
*H04L 29/06* (2006.01)
(Continued)

(52) U.S. Cl.
CPC .......... *H04L 63/0457* (2013.01); *H04L 9/002* (2013.01); *H04L 9/0819* (2013.01); *H04L 9/0861* (2013.01); *H04L 9/0894* (2013.01); *H04L 9/14* (2013.01); *H04L 9/302* (2013.01); *H04L 9/304* (2013.01); *H04L 63/306* (2013.01); *H04W 12/0013* (2019.01); *H04W 12/02* (2013.01); *H04W 12/0401* (2019.01); *H04W 12/0605* (2019.01); *H04W 12/1204* (2019.01); *H04W 12/1206* (2019.01);
(Continued)

(58) Field of Classification Search
CPC ... H04L 63/0457; H04L 9/002; H04L 9/0819; H04L 9/0861; H04L 9/0894; H04L 9/14; H04L 9/302; H04L 9/304; H04L 9/30; H04W 12/1206; H04W 12/0401; H04W 12/0605; H04W 12/02; H04W 12/1204; H04W 12/0013
USPC .......................................................... 380/28
See application file for complete search history.

(56) References Cited

U.S. PATENT DOCUMENTS

| | | | | |
|---|---|---|---|---|
| 6,459,792 B2* | 10/2002 | Ohmori | ................. | H04L 9/0891 380/37 |
| 2001/0031050 A1* | 10/2001 | Domstedt | ............. | H04L 9/0861 380/44 |
| 2003/0012372 A1* | 1/2003 | Cheng | ................... | H04L 1/0066 380/28 |

* cited by examiner

*Primary Examiner* — Longbit Chai

(57) ABSTRACT

A cryptanalysis method comprising:
(A) Performing a ciphertext-only direct cryptanalysis of A5/1 and
(B) Using results of Step (A) to facilitate the decryption and/or encryption of further communications that are consistent with encryption using the session key and/or decryption using the session key, wherein the cryptanalysis considers part of the bits of the session key to have a known fixed value, and wherein the cryptanalysis finds the session key. An efficient known plaintext attack on AS/2 comprises trying all the possible values for R4, and for each such value solving the linearized system of equations that describe the output;
The solution of the equations gives the internal state of RI, R2, and R3;

(Continued)

Together with R4, this gives the full internal state which gives a suggestion for the key.

15 Claims, 6 Drawing Sheets

Related U.S. Application Data continuation of application No. 15/465,629, filed on Mar. 22, 2017, now Pat. No. 9,887,972, which is a continuation of application No. 14/711,804, filed on May 14, 2015, now Pat. No. 9,634,832, which is a continuation of application No. 13/623,277, filed on Sep. 20, 2012, now Pat. No. 9,038,192, which is a continuation of application No. 13/184,775, filed on Jul. 18, 2011, now Pat. No. 8,295,477, which is a continuation of application No. 10/554,587, filed as application No. PCT/IL2004/000364 on Apr. 30, 2004, now Pat. No. 8,009,826.

(51) Int. Cl.
*H04W 12/02* (2009.01)
*H04L 9/30* (2006.01)
*H04W 12/00* (2021.01)
*H04W 12/04* (2021.01)
*H04W 12/06* (2021.01)
*H04W 12/12* (2021.01)
*H04L 9/08* (2006.01)
*H04L 9/14* (2006.01)
*H04W 4/14* (2009.01)
*H04W 84/04* (2009.01)

(52) U.S. Cl.
CPC ...... *H04L 2209/24* (2013.01); *H04L 2209/80* (2013.01); *H04W 4/14* (2013.01); *H04W 84/042* (2013.01)

CRYPTANALYSIS METHOD AND SYSTEM

PRIORITY CLAIMS

This application is a continuation of and claims priority from: U.S. patent application Ser. No. 15/859,795 titled "Cryptanalysis Method and System", filed by the inventors of the present invention on Jan. 2, 2018, which is a continuation of U.S. patent application Ser. No. 15/465,629 titled "Cryptanalysis Method and System", filed by the inventors of the present invention on Mar. 22, 2017, which is a continuation of U.S. patent application Ser. No. 14/711,804 titled "Cryptanalysis Method and System", filed by the inventors of the present invention on May 14, 2015, which is a continuation of U.S. patent application Ser. No. 13/623,277 titled "Cryptanalysis Method and System", filed by the inventors of the present invention on Sep. 20, 2012, which is a continuation of U.S. patent application Ser. No. 13/184,775, titled "Cryptanalysis Method and System", filed by the inventors of the present invention on Jul. 18, 2011, which is a continuation of U.S. patent application Ser. No. 10/554,587, titled "Cryptanalysis Method and System", filed by the inventors of the present invention on Sep. 25, 2006, which is a National Phase Application of PCT/IL2004/000364 filed on Apr. 30, 2004, which in turn claims priority from Israel Patent IL 155671 filed on Apr. 30, 2003, all of which are hereby incorporated into the present description in their entirety.

TECHNICAL FIELD

The present invention relates to cryptanalysis methods, and more particularly to ciphertext-only cryptanalysis of GSM encrypted communications received off the air.

The present invention is scheduled to be published as a scientific paper and presented in Crypto 2003 conference, Aug. 17-21, 2003, Santa Barbara, Calif., USA.

BACKGROUND OF THE INVENTION

This section details the need for the present invention, prior art cryptanalysis methods and the encryption method now used in GSM.

GSM is the most widely spread method of cellular communications. It includes a measure of data protection by encryption, which sometimes it may be desirable to decrypt.

For example, law enforcement agencies, such as the police, may desire to listen to cellular communications, without a physical connection to the cellular infrastructure. This process often requires court permission, and is sometimes referred to as lawful interception.

Customers have a sense of security when using the cellular phone, which sometimes is not justified. Eavesdroppers may listen on a conversation, hijack a call or make phone calls at a user's expense. It may be desirable to test the level of security of the system by performing attempts at attacking the system. The actual level of network security can thus be evaluated. Such tests may be performed by the cellular network provider, by local support entities or customer protection agencies.

The above, as well as other applications, require the performance of cryptanalysis in real time, in a short time period and using a reasonable amount of digital memory, such as has not been achieved in prior art.

GSM is the most widely used cellular technology. By December 2002, more than 787.5 million GSM customers in over 191 countries formed approximately 71% of the total digital wireless market. GSM incorporates security mechanisms. Network operators and their customers rely on these mechanisms for the privacy of their calls and for the integrity of the cellular network. The security mechanisms protect the network by authenticating customers to the network, and provide privacy for the customers by encrypting the conversations while transmitted over the air.

GSM uses encryption to protect transmitted signals. There are two basic methods in use now, A5/1 and A5/2, with the former mostly used in the Middle East and the latter generally for the rest of the world. The A5/1 is more difficult to decrypt without a prior knowledge of the key that has been used.

Thus, to listen to GSM transmissions, it is required to decrypt the messages. The frequency hopping in GSM makes the problem all the more difficult.

There are three main types of cryptographic algorithms used in GSM: A5 is a stream-cipher algorithm used for encryption, A3 is an authentication algorithm and A8 is the key agreement algorithm. The design of A3 and A8 is not specified in the specifications of GSM, only the external interface of these algorithms is specified. The exact design of the algorithm can be selected by the operators independently. However, many operators used the example, called COMP128, given in the GSM memorandum of understanding (MoU).

Prior art cryptanalysis methods pose unrealistic demands, such as a few minutes of known conversation to the bits, see list of references below.

Briceno, Goldberg, and Wagner have performed cryptanalysis of the found COMP128, allowing to find the shared (master) key of the mobile and the network, thus allowing cloning. The description of algorithm A5 is part of the specifications of GSK, but was never made public. There are two currently used versions of A5: A5/1 and A5/2. A5/1 is the "strong" export-limited version. A5/2 is the version that has no export limitations, however it is considered the "weak" version.

The exact design of both A5/1 and A5/2 was reverse engineered by Briceno from an actual GSM telephone in 1999 and checked against known test-vectors. An additional new version, which is standardized but not yet used in GSM networks is A5/3. It was recently chosen, and is based on the block cipher KASUMI.

GPRS (General Packet Radio Service) is a new service for GSM networks that offer 'always-on', higher capacity, Internet-based content and packet-based data services, it enables services such as color Internet browsing, e-mail on the move, powerful visual communications, multimedia messages and location-based services. GPRS uses its own cipher, however, the key for the GPRS cipher is created by the same A3A8 algorithm in the subscriber's SIM card, using the same $K_i$ as used for creating encryption keys for A5/1, A5/2 and A5/3. We will use this fact to attack it later.

A5/1 was initially cryptanalized by Golic, and later by: Biryukov, Shamir and Wagner, Biham and Dunkelman, and recently by Ekdahl and Johansson.

After A5/2 was reverse engineered, it was immediately cryptanalized by Goldberg, Wagner and Green. Their attack is a known plaintext attack that requires the difference in the plaintext of two GSM frames, which are exactly $2^{11}$ frames apart (about 6 seconds apart). The average time complexity of this attack is approximately $2^{16}$ dot products of 114-bit vectors.

Apparently, this attack is not applicable (or fails) in about half of the cases, since in the first frame it needs the 11th bit of R4 to be zero after the initialization of the cipher. A later work by Petrovic and Fuster-Sabater suggests to treat the initial internal state of the cipher as variables, write every output bit of the A5/2 algorithm as a quadratic function of these variables, and linearize the quadratic terms. They showed that the output of A5/2 can be predicted with extremely high probability after a few hundreds of known output bits. However, this attack does not discover the session key of A5/2 (Kc).

Thus, it is not possible to use this attack as a building block for more advanced attacks, like those that we present later. The time complexity of this later result is proportional to $2^{17}$ Gauss eliminations of matrices of size of (estimated) about 400×719.

Goldberg, Wagner and Green presented the first attack on A5/2. The time complexity of this attack is very low. However, it requires the knowledge of the XOR of plaintexts in two frames that are $2^{11}$ frames apart. Their attack shows that the cipher is quite weak, yet it might prove difficult to implement such an attack in practice. The problem is knowing the exact XOR of plaintexts in two frames that are 6 seconds apart.

Another aspect is the elapsed time from the beginning of the attack to its completion. Their attack takes at least 6 seconds, because it takes 6 seconds to complete the reception of the data. The novel method disclosed in the present application greatly improves the speed of the attack.

The known plaintext attack of Petrovic and Fuster-Sabater have similar data requirements as our attack, however it does not recover the session key (Kc) and, therefore, may not be suitable for the active attacks that we describe later.

The state of prior art can be reviewed in the following references:

1. A pedagogical implementation (in C programming language) of A5/1 and A5/2:

Marc Briceno, Ian Goldberg, David Wagner, A pedagogical implementation of the GSM A5/1 and A5/2 "voice privacy" encryption algorithms, http://cryptome.org/gsm-a512.htm (Originally on www.scard.org), 1999.

2. Description and cryptanalysis of COMP128, used by many GSM operators as A3A8:

Marc Briceno, Ian Goldberg, David Wagner, An implementation of the GSM A3A8 algorithm, http://www.iol.ie/kooltek/a3a8.txt, 1998.

Marc Briceno, Ian Goldberg, David Wagner, GSM Cloning, http://www.isaac.cs.berkeley.edu/isaac/gsm-faq.html, 1998.

3. Known-Plaintext Cryptanalysis of A5/1:

Eli Biham, Orr Dunkelman, Cryptanalysis of the A5/1 GSM Stream Cipher, Progress in Cryptology, proceedings of Indocrypt'00, Lecture Notes in Computer Science 1977, Springer-Verlag, pp. 43-51, 2000.

Alex Biryukov, Adi Shamir, Cryptanalytic Time/Memory/Data Tradeoffs for Stream Ciphers, Advances in Cryptology, proceedings of Asiacrypt'00, Lecture Notes in Computer Science 1976, Springer-Verlag, pp. 1-13, 2000.

Alex Biryukov, Adi Shamir, David Wagner, Real Time Cryptanalysis of A5/1 on a PC, Advances in Cryptology, proceedings of Fast Software Encryption'00, Lecture Notes in Computer Science 1978, Springer-Verlag, pp. 1-18, 2001.

Patrik Ekdahl, Thomas Johansson, Another Attack on A5/1, to be published in IEEE Transactions on Information Theory, http://www.it.lth.se/patrik/publications.html, 2002.

Jovan Golic, Cryptanalysis of Alleged A5 Stream Cipher, Advances in Cryptology, proceedings of Eurocrypt'97, LNCS 1233, pp. 239-255, Springer-Verlag, 1997.

4. A5/2 related information:

Ian Goldberg, David Wagner, Lucky Green, The (Real-Time) Cryptatialysis of A5/2, presented at the Rump Session of Crypto'99, 1999.

Security Algorithms Group of Experts (SAGE), Report on the specification and evaluation of the GSM cipher algorithm A5/2, http://cryptome.org/espy/ETR278e01 p.pdf, 1996.

Slobodan Petrovic, Amp aro Fuster-Sabater, Cryptanalysis of the A5/2 Algorithm, Cryptology eprint Archive, Report 2000/052, Available online on http://eprint.iacr.org, 2000.

Description of A5/2 and GSM Security Background

In this section we describe the internal structure of A5/2 and the way it is used, see FIG. 4. A5/2 consists of 4 maximal-length LFSRs: RI, R2, R3, and R4. These registers are of length 19-bit, 22-bit, 23-bit, and 17-bit respectively. Each register has taps and a feedback function. Their irreducible polynomials are: $x^{19} \oplus x^5 \oplus x^2 \oplus x \oplus 1$, $x^{22} \oplus x \oplus 1$, $x^{23} \oplus x^{15} \oplus x^2 \oplus x \oplus 1$, and $X^{17} \oplus x^5 \oplus 1$, respectively.

Note that we give the bits in the registers in reversed order, i.e., in our numbering scheme, $x^i$ corresponds to a tap in index len-i-1, where len is the absolute register length. For example, when R4 is clocked, the XOR of R4[17−0−1=16] and R4[17−5−1=11] is computed. Then the register is shifted one place to the right, and the value of the XOR is placed in R4[0].

At each step of A5/2 registers R1, R2 and R3 are clocked according to a clocking mechanism that is described later. Then, register R4 is clocked. After the clocking was performed, one output bit is ready at the output of A5/2. The output bit is a non-linear function of the internal state of R1, R2, and R3.

After the initialization 99 bits of output are discarded, and the following 228 bits of output are used as the output key-stream. Some references state that A5/2 discards 100 bits of output, and that the output is used with a one-bit delay. This is equivalent to stating that it discards 99 bits of output, and that the output is used without delay.

Denote $K_c[i]$ as the i'th bit of the 64-bit session-key $K_c$, Rj[i] the i'th bit of register j, and f[i] the i'th bit of the 22-bit publicly known frame number.

The key-stream generation is as follows:
1. Initialize with $K_c$ and frame number.
2. Force the bits R1[15], R2[16], R3[18], R4[10] to be 1.
3. Run A5/2 for 99 clocks and ignore the output.
4. Run A5/2 for 228 clocks and use the output as key-stream.

The first output bit is defined as the bit that is at the output after the first clocking was performed.

The initialization is done in the following way:
Set all LFSRs to 0 (R1=R2=R3=R4=0).
For i:=0 to 63 do
1. Clock all 4 LFSRs.
2. R1[0]←R1[0] $\oplus K_c[i]$
3. R2[0]←R2[0] $\oplus K_c[i]$
4. R3[0]←R3[0] $\oplus K_c[i]$
5. R4[0]←R4[0] $\oplus K_c[i]$
For i:=0
to 21 do
1. Clock all 4 LFSRs.
2. R1[0]←R1[0] $\oplus f[i]$
3. R2[0]←R2[0] $\oplus f[i]$
4. R3[0]←R3[0] $\oplus f[i]$
5. R4[0]←R4[0] $\oplus f[i]$ In FIG. 4 the internal structure of A5/2 algorithm is showed.

The clocking mechanism works as follows: register R4 controls the clocking of registers R1, R2, and R3. When clocking of R1, R2, and R3 is to be performed, bits R4[3], R4[7], and R4[10] are the input of the clocking unit. The clocking unit performs a majority function on the bits. R1 is clocked if and only if R4[10] agrees with the majority. R2 is clocked if and only if R4[3] agrees with the majority. R3 is clocked if and only if R4[7] agrees with the majority. After these clockings, R4 is clocked.

Once the clocking was performed, an output bit is ready. The output bit is computed as follows:

output=R1[18] $\oplus$maj(R1[12],R1[14] $\oplus$1, R1[15]) $\oplus$R2[21] $\oplus$maj(R2[9],R2[13],R2[16] $\oplus$1) $\oplus$R3[22] $\oplus$maj(R3[13] $\oplus$1,R3[16],R3[18]), where maj(•,•,•) is the majority function. i.e., out of each register, there are 3 bits whose majority is XORed to form the output (when one bit of each triplet is inverted), in addition to the last bit of each register. Note that the majority function is quadratic in its input: maj(a,b,c)=ab$\oplus$bc $\oplus$ca.

A5/2 is built on a somewhat similar framework of A5/1. The feedback functions of R1, R2 and R3 are the same as A5/1's feedback functions. The initialization process of A5/2 is also somewhat similar to that of A5/1. The difference is that A5/2 also initializes R4, and that after initialization one bit in each register is forced to be 1. Then A5/2 discards 99 bits of output while A5/1 discards 100 bits of output. The clocking mechanism is the same, but the input bits to the clocking mechanism are from R4 in the case of A5/2, while in A5/1 they are from RI, R2, and R3. The designers meant to use similar building blocks to save hardware in the mobile.

This algorithm outputs 228 bits of key-stream. The first block of 114 bits is used as a key-stream to encrypt the link from the network to the customer, and the second block of 114 bits is used to encrypt the link from the customer to the network. Encryption is performed as a simple XOR of the message with the key stream.

Although A5 is a stream cipher, it is used to encrypt 114-bit "blocks". Each such block is the payload of a GSM burst, which is a GSM air-interface data unit. Note that each frame-is constructed of 8 consecutive bursts, serving 8 customers in parallel. Each customer is allocated a burst index. All the bursts in this index are designated for that customer. The frames are sequentially numbered, and each frame has a 22-bit publicly known frame number associated with it. This frame number is used when initializing A5. Since the focus is always on a single customer, we use the terms "burst" and "frame" interchangeably.

One might wonder why does GSM use a stream cipher and not a block cipher of 114-bit block size. A possible explanation is that GSM performs error-correction and then encryption. Assume that one bit in a block is flipped due to an error. Decrypting that block with a block cipher would result in a block that would appear random, and that the error-correction codes have no chance to correct. However, when using a stream cipher, one flipped bit causes exactly one flipped bit after decryption.

GSM Security Background

Following is a more detailed description on the usage and specification of A3 and A8 algorithms.

A3 provides authentication of the mobile to the network, and A8 is used for session-key agreement. The security of these algorithms is based on a user-specific secret key Ki that is common to the mobile and the network. The GSM specifications do not specify the length of Ki, thus it is left for the choice of the operator, but usually it is a 128-bit key. Authentication of the customers to the network is performed using the A3 authentication algorithm as follows: The network challenges the customer with a 128-bit randomly chosen value RAND. The customer computes a 32-bit long response SRES=A3($K_i$,RAND), and sends SRES to the network, which can then check its validity.

The session key $K_c$ is obtained by the A8 algorithm as follows: $K_c$=A8($K_i$,RAND). Note that A8 and A3 are always invoked together and with the same parameters. In most implementations, they are one algorithm with two outputs, SRES and $K_c$. Therefore, they are usually referred to as A3A8.

The above description of prior art encryption in GSM is relayed upon in the detailed description of the invention below. In this invention the term cryptanalysis is used to describe the process of being able to encrypt/decrypt communication without the prior knowledge of the used session key. In some cases, the cryptanalysis can retrieve the session key that is used. In other cases the session key is not retrieved, however it might still be possible to decrypt or encrypt messages in the same way that would have been if the relevant cipher were used using the session key. Sometimes in this invention the term decryption is also used in the meaning of cryptanalysis.

Known plaintext means that the attacker has access to encrypted messages as well as to the messages that were encrypted.

Ciphertext only means that the attacker has access only to the encrypted messages, and has no access to the messages before they were encrypted.

In this invention the term phone should be understood in the broader sense of a cellular device using the GSM network.

SUMMARY OF THE INVENTION

According to the present invention, there is provided a method and system for performing effective cryptanalysis of GSM encrypted communications. The method uses ciphertext-only cryptanalysis. The system needs not be connected by wire to the cellular infrastructure, rather it may receive messages transmitted on the air.

New methods for attacking GSM encryption and security protocols are disclosed. These methods are much easier to apply and much faster.

Basically, for A5/2 GSM, a mobile attacker system receives the encrypted messages, performs an efficient cryptanalysis and enables listening to the GSM messages and/or to review related information. When performed on a personal computer, the process may take less than one second.

In principle, a similar method can be applied to A5/1 GSM, however in this case the encryption is more complex and may require about 5 minutes of communication messages to decrypt. A complex system, which may be difficult to implement, may be required since it has to keep track of frequency hopping in GSM.

According to another aspect of the present invention, for A5/1 GSM the attacker system creates a small cell around itself, which cell includes the target GSM phone. The system impersonates the cellular network for the target phone, and the target phone for the GSM infrastructure. This requires a transmit capability in the attacker system, however the decryption is greatly simplified and much faster.

Moreover, novel improvements in the GSM networks are presented. These include improvements in the cryptographic algorithms and protocols. Such improvements can be performed, for example, by GSM operators.

Even GSM networks using the new A5/3 succumb to our attack, in the way that A5/3 is integrated into GSM. The present disclosure includes changes to the way A5/3 is integrated to protect the networks from such attacks.

By performing such tests or attacks on the cellular network, a higher level of security can be achieved and maintained. Present and future weak points can be detected and corrective actions may be taken. The structure of GSM network itself can thus be improved to increase its security.

The present invention might not be limited to the GSM cellular network: for example, a similar version of A5/3 is also used in third generation cellular networks.

Further objects, advantages and other features of the present invention will become apparent to those skilled in the art upon reading the disclosure set forth hereinafter.

DETAILED DESCRIPTION OF THE INVENTION

A preferred embodiment of the present invention will now be described by way of example and with reference to the accompanying drawings.

Figure 1:
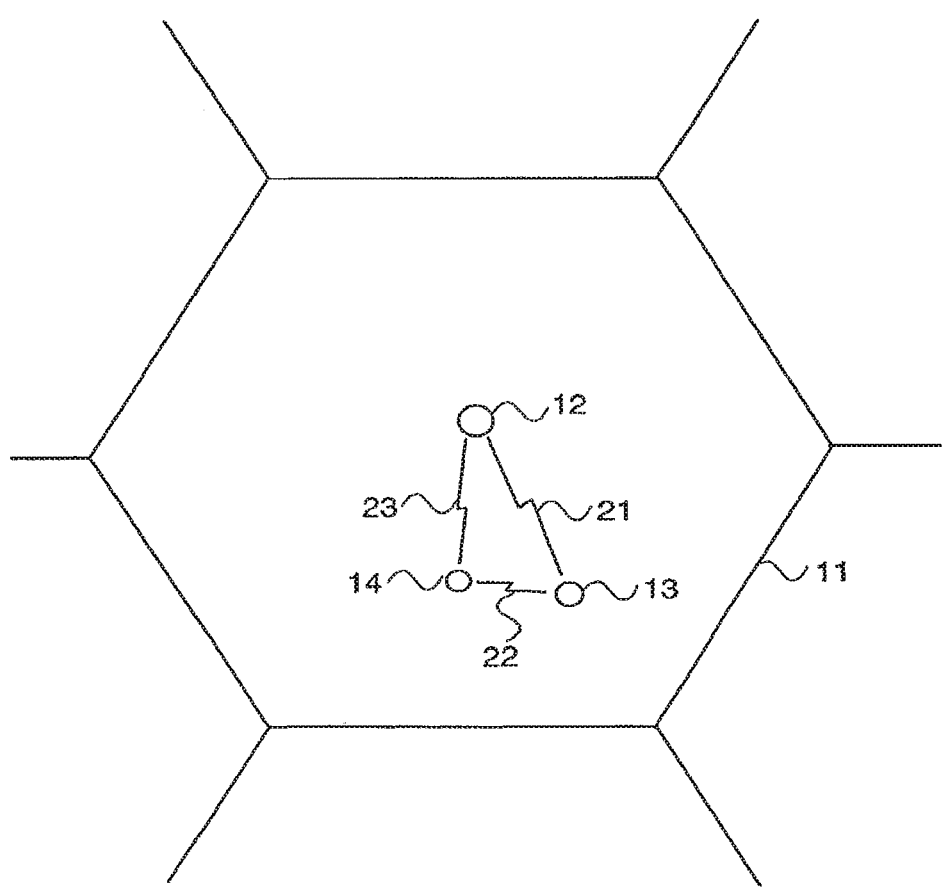
FIG. 1 illustrates a GSM cell with a base station, a subscriber and an attacker system.

FIG. 1 illustrates a GSM cell 11 with a base station 12, a subscriber 13 and an attacker system 14. There are wireless links 21, 22, 23 between these units.

Figure 2:
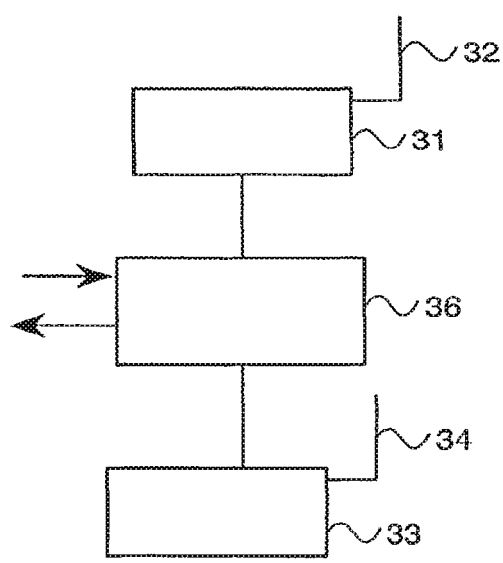
FIG. 2 details a block diagram of the attacker system.

FIG. 2 details a block diagram of the attacker system. The system may be used to implement the methods detailed in the present disclosure. The attacker system comprises a first transceiver 31 with antenna 32, which communicates with a target subscriber set, and a second transceiver 33 with antenna 34, which communicates with a base station. The system also includes a computer/controller 36, which controls the operation of the system, is controlled by the operator and displays the results of the decryption. The computer 36 also allows the operator to listen to the target phone's communications.

Figure 3:
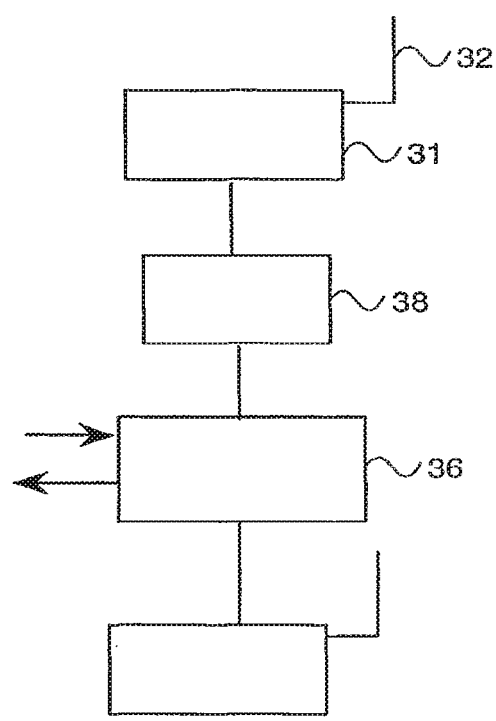
FIG. 3 details a block diagram of another embodiment of the attacker system.

FIG. 3 details a block diagram of another embodiment of the attacker system. It includes a first transceiver 31 which is at a different location than the transceiver 33—the former is located near a target subscriber, the latter—near the base station.

The system further includes an interface means 38, allowing the first transceiver 31 to be placed at a remote location.

Alternately, the system may use directional antennas directed each towards a subscriber or the base station, respectively.

Although the examples here refer mostly to GSM A5/2, A5/1, A5/3, and GPRS, they can be adapted to other networks as well, using the present invention.

The examples in the present disclosure detail a ciphertext-only cryptanalysis of GSM encrypted communication. The attacks work on GSM networks that employ, for example, A5/1 or A5/2 and even the newly chosen A5/3.

The attack on A5/2 requires about 40 milliseconds of encrypted off-the-air cellular conversation and finds the correct key in less than a second on a personal computer. It is shown how to easily leverage our attack against A5/2 to active attacks against networks that use A5/1 or A5/3. Previous attacks on GSM required unrealistic information, like long known plaintext periods. Our attacks are the first practical attacks on GSM networks and require no knowledge about the content of the conversation.

These attacks enable attackers to tap any conversation and decrypt it either in real-time, or at any later time. We also show how to mount active attacks, such as call hijacking, altering of data messages and call theft. Even when such active attacks are applied, they cannot be identified by the network operator using prior art methods and systems.

The A5/3 is also used in third generation cellular networks, thus the present invention is not limited to GSM, rather it can be used with other cellular systems as well.

The present disclosure illustrates a method for mounting a ciphertext only attack on A5/2. In tests we made, our attack found the key in less than one second on a personal computer. It is shown that the attack we propose on A5/2 can be leveraged to mount an active attack even on GSM networks that use A5/1 and A5/3, thus realizing a real-time active attack on GSM networks, without any prior required knowledge.

Method for Ciphertext Only Attack

Figure 5:
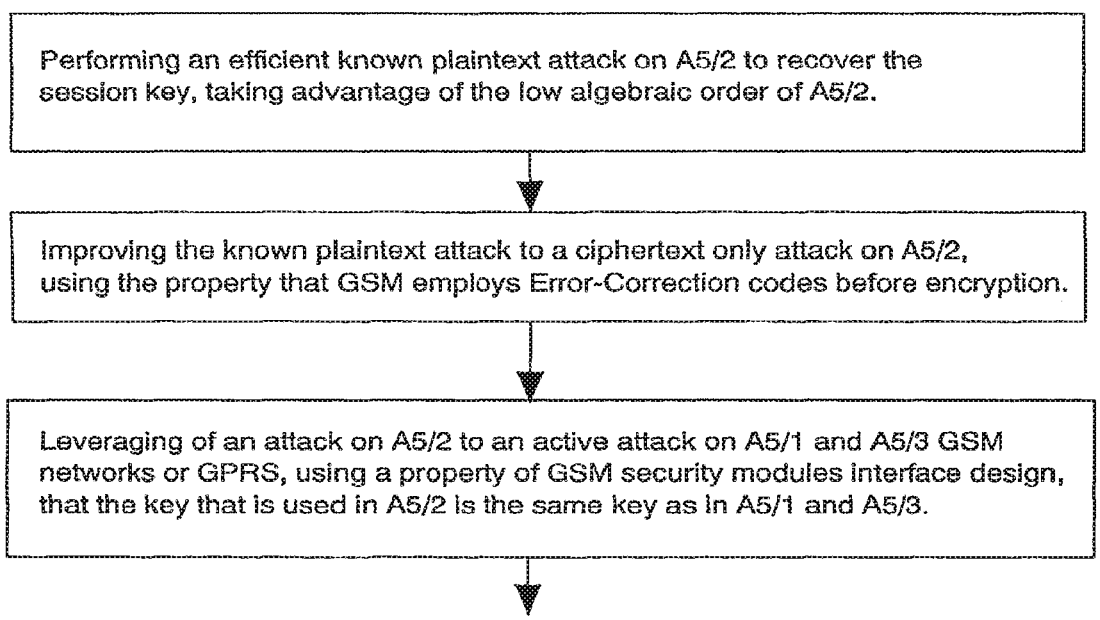
FIG. 5 details a method for ciphertext only attack
FIG. 6 details a Known Plaintext Attack on A5/2 Method

The new full attack method comprises, see for example FIG. 5:

1. An efficient known plaintext attack on A5/2 that recovers the session key. This first attack is algebraic in nature. It takes advantage of the low algebraic order of the A5/2 output function. We represent the output of A5/2 as a quadratic multivariate function in the initial state of the registers. Then, we construct an overdefined system of quadratic equations that expresses the key-stream generation process and we solve the equations.

2. Improving the known plaintext attack to a ciphertext only attack on A5/2. We observe that GSM employs Error-Correction codes before encryption. We show how to adapt the attack to a ciphertext only attack on A5/2 using this observation.

3. Leveraging of an attack on A5/2 to an active attack on A5/1 and A5/3 GSM networks, and also to GPRS. The present inventor has found that, due to the GSM security modules interface design, the key that is used in A5/2 is the same key as in A5/1 and A5/3. And the same mechanism that sets the key in the A5 cipher, i.e., A3A8 is used to set the key for GPRS. It is showed how to mount an active attack on any GSM network.

End of method.

Note: See the description of A5/2 and GSM Security Background in the Background section of the present disclosure.

Known Plaintext Attack on A5/2 Methods

In this section we present a new known plaintext attack (known key-stream attack) on A5/2. Given a key-stream, divided to frames, and the respective frame numbers, the attack recovers the session key.

Compared with prior art attacks, the novel attack method might look as if it requires more information, however, it works within only a few milliseconds of data. We then improve our attack to a ciphertext only attack that requires only about 40 milliseconds of encrypted, unknown data. Therefore, our attack is very easy to implement in practice. We have simulated our known plaintext attack on a personal computer, and verified the results. This simulation recovers the key in less than a second.

The computation time and memory complexity of this attack are similar to Goldberg, Wagner and Green's attack.

Figure 6:
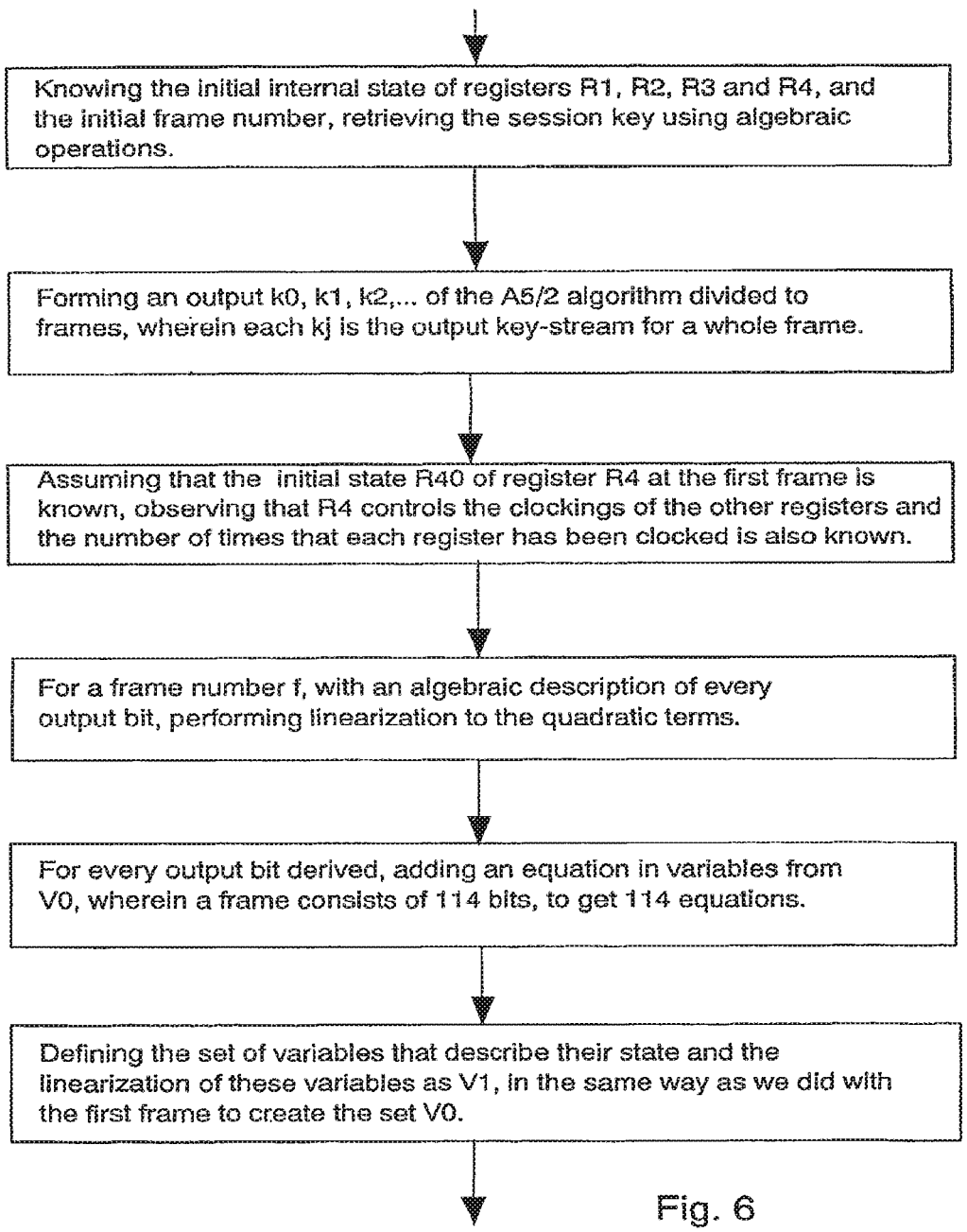

Thus, the method comprises, see FIG. 6:

1. Knowing the initial internal state of registers R1, R2, R3 and R4, and the initial frame number, the session key can be retrieved using simple algebraic operations. This is mainly because the initializing process is linear in the session key and the initial frame number.

Therefore, in the attack we focus on revealing the initial internal state of the registers.

2. Let $k_0, k_1, k_2, \ldots$ be the output of the A5/2 algorithm divided to frames. Note that each $k_j$ is the output key-stream for a whole frame, i.e., each $k_j$ is 114 bits long. Let f, f+1, f+2, ... be the frame numbers associated with these frames, where f is the initial frame number. We denote as $k_j[i]$ the i'th bit of the key-stream at frame j. The initial internal state of register Ri at frame j is noted as $Ri_j$. This is the internal state after the initialization but before the 99 clockings. Note that this notation is somewhat imprecise, since the output is actually 228 bits, when the first part is used to encrypt the network-to-mobile link, and the second 114-bit part the mobile-to-network link.

3. Assume that the initial state $R4_0$ of register R4 at the first frame is known. An important observation is that R4 controls the clockings of the other registers, and since R4 is known, the exact number of times that each register has been clocked since its initial state is also known. Each register has a linear feedback, therefore, once given the number of times a register is clocked, every bit of its internal state can be expressed as a linear combination of bits of the original internal state.

Figure 4:
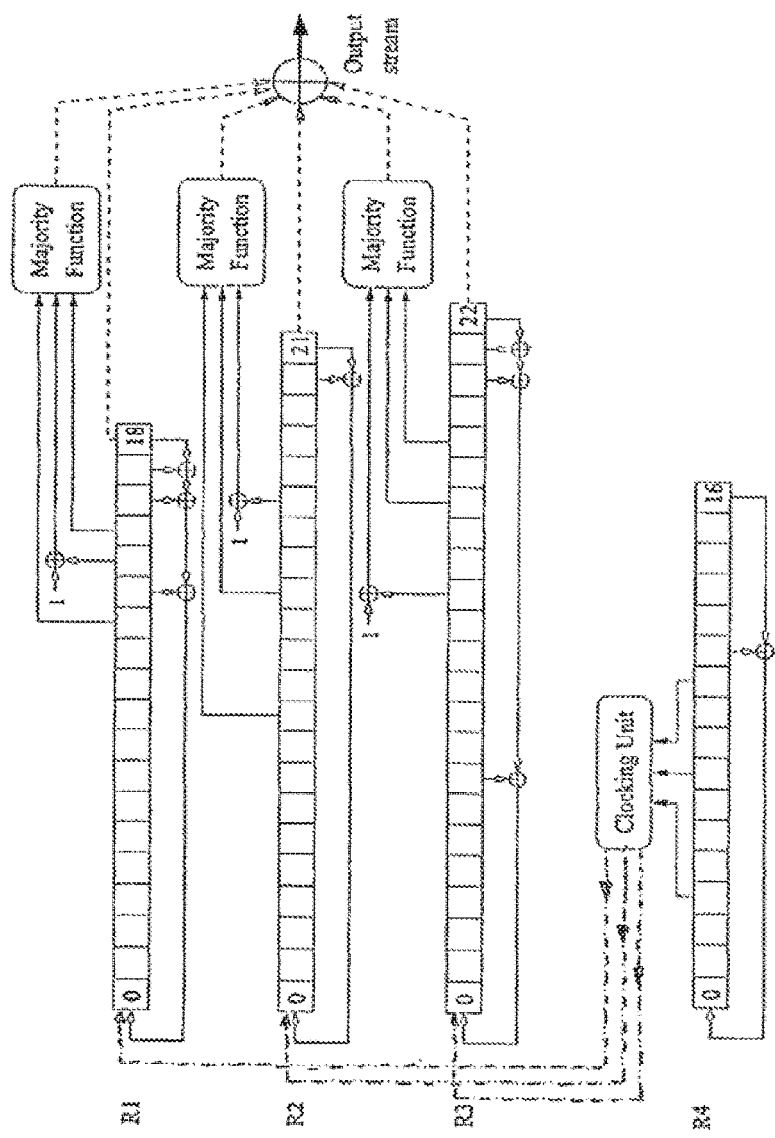
FIG. 4 details the A5/2 internal design (prior art).

4. The output of the A5/2 algorithm is an XOR of the last bits of registers R1, R2, and R3, and three majority functions of bits of R1, R2 and R3 (see FIG. 4 for the exact details). Therefore, the resulting function is quadratic, when the variables are the bits in the initial state of these registers. We take advantage of this low algebraic degree of the output. The goal in the next paragraphs is to express every bit of the whole output of the cipher (constituting of several frames) as a quadratic multivariate function in the initial state. Then, we construct an overdefined system of quadratic equations that expresses the key-stream generation process and solve it.

5. Given a frame number f, there is an algebraic description of every output bit. We perform linearization to the quadratic terms in this algebraic description. We observe that each majority function operates on bits of a single register. Therefore, we have quadratic terms consisting of variables of the same register only. Taking into account that one bit in each register is set to 1: R1 contributes 18 linear variables plus all their (17·18)/2=153 products. In the same way R2 contributes 22+(22·21)/2=22+231 variables and R3 contributes 22+(22·21)/2=22+231 variables. So far there are 18+153+21+210+22+231=655 variables after linearization. A variable that will take the constant value of 1 is also needed. In total we have a set of 656 variables. We denote the set of these 656 variables by $V_0$. Of these variables, 18+21+22=61 variables directly describe the full initial state of R1, R2, and R3.

6. Every output bit we have, adds an equation in variables from $V_0$. A frame consists of 114 bits. Therefore, we get 114 equations from each frame. The solution of the equation system reveals the value of the variables in $V_0$, and among them the linear variables that directly describe the initial internal state of R1, R2, and R3. However, there are not enough equations at this stage to efficiently solve the system.

The main observation is that given the variables in $V_0$ defined on frame f, the bits of any other frame can be described in linear terms of the variables in the set $V_0$. When moving to the next frame, the frame number is incremented by 1 and the internal state is re-initialized. We assume that the value of register $R4_0$ is known. Due to the initialization method, where the frame number is XORed bit by bit into the registers (see the description of A5/2), we know the value of $R4_1$. Since the values $R1_0$, $R2_0$, and $R3_0$ are not known, we do not know the value of registers $R1_1$, $R2_1$, and $R3_1$, either, but we do know the XOR-difference between $R1_0$, $R2_0$, $R3_0$ and $R1_1$, $R2_1$, $R3_1$, respectively.

7. We define the set of variables that describe their state and the linearization of these variables as $V_1$, in the same way as we did with the first frame to create the set $V_0$. Due to the initialization method, for each register i we know the difference between $Ri_1$ and $Ri_0$. Knowing the difference, we can describe the variables in the set $V_1$ in linear term of the variables in the set $V_0$. That is, including the quadratic terms! To see this, assume that $a_1 \cdot b_1$ is a quadratic term in $V_1$, naturally $a_0 b_0$ is a quadratic term in $V_0$, and the difference $d_a$ and $d_b$ is known, such that: $a_1 = a_0 \oplus d_a$ and $b_1 = b_0 \oplus d_b$.

8. Therefore, as $a_1 \cdot b_1 = (a_0 \oplus d_a) \cdot (b_0 \oplus d_b) = a_0 \cdot b_0 \oplus a_0 d_b \oplus b_0 d_a \oplus d_a d_b$. Since $d_b$ and $d_a$ are known, this equation is linear in the variables in $V_0$. This fact enables to use the output bits in the second frame in order to get additional linear equations in the variables of $V_0$. The same follows for any other frame.

It is clear that once 656 linearly independent equations are obtained, the system can be easily solved using Gauss elimination. However, it is practically very difficult to collect 656 linearly independent equations. This is an effect of the frequent re-initializations, and the low order of the majority function. It is not actually need to solve all the variables, i.e. it is enough to solve the linear variables of the system, since the other variables are defined as their products. We have tested experimentally and found that after about 450 equations are sequentially obtained, the original linear variables in $V_0$ can be solved using Gauss elimination.

End of method.

This attack can be summarized as follows: all the possible values for $R4_0$ are tried, and for each such value the linearized system of equations that describe the output is solved. The solution of the equations gives the internal state of R1, R2, and R3. Together with R4, the full internal state which gives a suggestion for the key is known.

The time complexity of the attack is as follows: There are $2^{16}$ possible guesses of the value of $R4_0$. This figure should be multiplied by the time it takes to solve a linear binary system of 656 variables for a specific guess, i.e., about $656^3 \approx 2^{28}$ XOR operations, or about $2^{44}$ XORs in total.

Result: we have successfully implemented this algorithm, it takes about 40 minutes on our Linux 800 MHz PIII personal computer. The memory requirement is negligible: holding the linearized system in memory requires $656^2$ bits≈54 KB. When implementing the algorithm on a personal computer, we took advantage of the fact that a PC machine can perform the XOR of 32 bits with 32 other bits in one operation.

Optimization of the Known Plaintext Attack on A5/2 Method

A possible optimization is filtering wrong values of $R4_0$, and solving the system of equations only for the correct value of $R4_0$. The filtering is based on the observation that the system of equations for every suggestion of $R4_0$ contains linearly dependent lines. This filtering saves a considerable amount of time, by saving the relatively expensive solving of the equation systems.

1. There is a different system of equations for every different value of $R4_0$. Our filtering stage technique requires a pre-computation stage that solves the $2^{16}$ possible systems in advance. Given the matrix S that describes the system, and for any output k, i.e., $S \cdot V_0 = k$, we compute a "solving matrix" T of the system.

2. The matrix T is computed by taking the unit matrix that has the same number of rows as the S matrix, and applying to it the same series of elementary operations that are performed during a Gauss elimination of S. Multiplication by T on the left of S has the impact of applying Gauss elimination to S:

$$T \cdot S = \begin{matrix}(V_s)\\0\end{matrix}$$

where $V_s$ is a matrix whose lines are linearly independent, and the rows below the matrix $V_s$ are all zero lines. The zero lines are the result of the equation system containing linearly dependent lines. What we are interested in is taking advantage of the linearly dependent lines of S.

3. We take this advantage by using linearly dependent bits of the output of A5/2:

$$T \cdot k = T \cdot S \cdot V0 = \begin{matrix}(V_s)\\0\end{matrix} \cdot V_0$$

4. We like to verify the guess for the value of $R4_0$, i.e., filter wrong guesses of $R4_0$. The lines of T which once multiplied by the output k result in the value zero can be used. On a correct guess, all these lines result in a zero after the above multiplication. On a wrong guess, each line has a probability of about half to be zero once multiplied by k. Therefore, on average about two lines (dot products) have to be computed for each wrong guess of $R4_0$. During the pre-computation we keep for each possible value of $R4_0$ only about 16 of the lines of T that get the value 0 once multiplied by k. When performing the attack wrong $R4_0$ guesses are filtered by multiplying the saved lines by k.

5. When the result of all the multiplications for a guessed $R4_0$ are zero, we have a candidate equation system, which is actually a candidate for a value for $R4_0$. Given the suggestion for $R4_0$, we solve the suggested equation system and compute the initial internal state of R1, R2, and R3. Together with the guess of $R4_0$, $K_c$ can be easily determined. The filtering stage is designed so that the correct guess for $R4_0$ survives it. Note that the number of values of $R4_0$ that survives the filtering stage is about one, i.e., the correct value for $R4_0$.

End of method.

Result: The memory complexity is about the $2^{27.8}$ bytes (less than 250 MBs) needed to store the above row-vectors.

The above result applies when known plaintext from the wireless link originating from the network towards the mobile phone is used. When using the known plaintext from the link originating from the mobile phone towards the network, a few more equations are needed to reach a state that there are linearly depended lines. That is because on the link from the phone toward the network, the second block of 114 bits out of the 228 bits of the output of A5/2 are used. These bits are less affected by the frequent re-initializations, and therefore a little bit less linearly depended.

Note that when using this optimization some compromise is needed.

Since four known plaintext frames are required, the XOR between the frame number f and each one of f+1, f+2 and f+3 must be known in advance, before exact value f is known. This XOR-difference is required in order to express the frames' key stream bits as linear terms over the set $V_0$, and to compute the system of equations. In other words, the system of equations depends not only on $R4_0$ but also on the XOR-difference.

The problem here is the addition operation, for example, f+1 can result in a carry that would propagate through f, thus not allowing the calculation of the XOR-difference in advance. To make the calculation easy, we require that f will have a specific bit set to 0. This requirement prevents a carry from propagating beyond the specific bit. We take into account that we need to calculate the XOR-difference for up to an addition of the number 3 to the frame number f, therefore, we need the value of the third least significant bit of f to be zero, and also need to require that the two last bits in f have a constant value since any combination of these bits results in a different XOR-difference after addition.

These requirements are sufficient to allow calculating the above differences in advance. To allow any constant value of the two lower bits of f, the pre-computation is performed for each such possible value. There are four possible values. This fact multiplies the memory complexity by a factor of four, and the pre-computation time complexity by a factor of four as well. The above memory complexity already includes this factor. We can remove the requirement for the third bit to be 0, in the case that the two lower bits are zeros, due to the fact that in this case an addition of up to three can not cause a carry outside the first two bits.

Thus, out of the eight possible values to the three lower bits of f, we allow five. We stress that this limitation on the possible values of f has no serious practical implications since it is needed to wait at most 3 frames for a frame number that qualify for the requirements. The instant Ciphertext-only attack that we describe relies on this attack and needs to work in 4 frame blocks. Note that in this case, if the first of frame number, out of four consecutive frame does not meet the requirements. If that happens, it is assured that the first frame number in following block of 4 frames meets the requirements.

We analyze the time complexity of this optimized attack as follows: given a value of the frame number f, for each wrong guess of $R4_0$ we need to try two dot products on average. Once we have the correct $R4_0$ value, the time needed to solve the equation system for the correct value is about $2^{28}$, which is negligible. Therefore, the average time complexity of this optimized attack is approximately $2^{16}$ dot products.

We analyze the time complexity of the pre-computation as follows: in the pre-computation stage we compute the system of equations S and its T matrix for every $R4_0$ value, out of the $2^{16}$ possible values, and for every allowed XOR-difference of f. For each such system, we only keep about 16 of the lines of T that get the value 0 once multiplied by k. To compute T we perform Gauss elimination over S. The time complexity for the Gauss elimination is about $2^{28}$ XORs. When multiplying the above figures we get $2^{44}$. Since we repeat the process for every one of the four required XOR-difference of f we multiply this figure by four. Therefore, the pre-processing time complexity is $2^{46}$ XORs.

We have implemented this optimized attack on our personal computer, and it takes less than a second to recover $K_c$. The one-time pre-computation takes about 160 minutes.

An Instant Ciphertext Only Attack on A5/2 Method

In this section we show an attack on A5/2. An important factor that facilitates us to convert the attack of "Known Plaintext Attack on A5/2" to a ciphertext only attack against A5/2 is that in GSM error correction codes are employed before the encryption. Thus, the plaintext of the encryption has a highly structured redundancy.

There are several types of error correction methods that are used in GSM, and different error correction schemes are used for different data channels. For simplicity, we focus on control channels, and specifically on the error-correction codes of the Slow Associated Control Channel (SACCH). Note that this error-correction code is the only code that is used in the initiation of a conversation. Therefore, it suffices to focus on this code. Using this error-correction code we mount a ciphertext-only attack that recovers the key. However, the new attack method can be applied to other error-correction codes as well.

In the SACCH, the message to be coded with error-correction codes has a fixed size of 184 bits. The result is 456-bit long. This 456-bit message is interleaved to 4 bursts. The coding operation and interleaving operation can be modeled together as one 456×184 matrix over GF(2), which we denote by G. The message to be coded is regarded as a 184-bit binary vector, P. The result of the coding-interleaving operation is: M=GP. The resulting vector M is divided to 4 bursts. In the encryption process each burst is XORed with the output of A5/2 for the respective burst.

Since the G matrix is a 456×184 binary matrix, there are 456−184=272 equations that describe the kernel of the inverse transformation. In other words, given the vector M=GP, there are 272 linearly independent equations on its elements. Let $K_G$ be a matrix that describes these linear equations, i.e., $K_gM=0$ for any such M.

We denote the output sequence bits of A5/2 for a duration of 4 frames by $k=k_j\|k_j+1\|k_j+2\|k_j+3$, where $\|$ is the concatenation operator. The ciphertext C is computed by $C=M\oplus K$. We use the same 272 equations on C, namely:

$$K_G(M\oplus k)=K_GM\oplus K_Gk=0 \oplus K_Gk=K_Gk.$$

Since the ciphertext C is known, we actually get linear equations over elements of k.

Note that the equations we get are independent of P—they only depend on k. We substitute each bit in k with its description as linear terms over $V_0$ (see our description of the instant known-plaintext attack), and thus get equations on variables of $V_0$. Each 456-bit coding block, provides 272 equations. The rest of the details of the attack and its time complexity are similar to the optimized case in the previous section, when we substitute k with $K_Gk$.

While in the known-plaintext attack four frames of data are enough to launch the attack, in the ciphertext-only attack we need eight frames, since from each encrypted frame, we get only about half of the information compared to the known plaintext attack. When analyzing the time and memory complexity of this ciphertext only attack, we take into consideration that we restrict the lower four bits of the frame number f. We allow only 9 out of the 16 possible values for these four bits. This restriction doubles the memory complexity compared to the optimized known-plaintext attack, and it also doubles the pre-computation complexity.

End of method.

We summarize the complexity of the ciphertext only attack as follows: the average time complexity of this ciphertext only attack is approximately $2^{16}$ dot products. The memory complexity is about $2^{28.8}$ bytes (less than 500 MBs), the pre-computation time complexity is about $2^{47}$ XORs. Our implementation on a personal computer recovers $K_c$ in less than a second, and it takes about 320 minutes for the one-time pre-computation to complete.

We have also successfully enhanced the attack of Goldberg, Wagner, and Green and the attack of Petrovic and Fuster-Sabater to a ciphertext-only attack using our methods. When given the current disclosure, the abovementioned enhancement should be obvious to those skilled in the art.

Direct Attack Against A5/1 Method

Following is an example of such a direct attack:

Given a block of several frames that are encrypted, we use the methods of pervious sections, to compute $K_Gk$. These bits that we get are only dependent in the output of A5/1 on the several frames. We call this output bits the coded-stream. Let's assume that the frame number of the first frame of these frames is known to be divided by four without remainder. The whole process can be viewed as a function from the internal state of A5/1, to the coded stream. Let f( ) be that function, when only 64 bits of output are condifered, therefore, f( ) maps 64 bits to 64 bits.

So f( ) is a function that takes an internal state of A5/1 after initialization, and outputs the coded stream. Inverting f( ) will reveal the internal state, and break the cipher. Note that we must make an assumption regarding the frame number, otherwise, f( ) depends on the frame number. We can apply one of the time-memory-data tradeoff known in the art, for example the ones that are described by Biryukov and Shamir in their paper "Cryptanalytic Time/Memory/Data Tradeoffs for Stream Ciphers", Advances in Cryptology, proceedings of Asiacrypt'00, Lecture Notes in Computer Science 1976, Springer-Verlag, pp. 1-13, 2000.

We use their notations for the tradeoff, i.e., N is the internal states space, T is the number of evaluations of f( ), D is the number of available data points, M is the number of memory lines. In this case $N=2^{64}$, and each memory line is 16 bytes long. For example, on the tradeoff curve $N^2=D^2M^2T$, $T>D^2$, and $N=2^{64}$, one point is $D=2^8$ which is about 8 seconds of off-the-air data, $M=2^{39}$, which is about 8.8 Tera-Byte (Can be stored on 44 hard-disks of 200 GBs). If we take a similar coding to the pervious sections, that means that we have to multiply the data by 4 to compensate for the different frame numbers. So 176 hard-disks of 200 GBs are needed.

The time it takes for an actual attack is therefore, $T=2^{34}$ valuations of f( ). Assuming that fo can be computed $2^{20}$ times in a second on a single personal computer, the computation requires $2^{14}$ seconds. On a network with 1000 computers it takes about 16 seconds. It will result in about $2^{17}$ random disk accesses, each disk can be randomly accessed about 200 times a second, therefore, the access time is about 655 seconds, but there are 176 hard-disks, therefore, the total access time is 3.76 seconds, which are done in back-ground when the other computations are performed.

Precomputation takes N/D, which is 256 evaluations of f( ), that takes $2^{36}$ seconds on a personal computer. We need to compute it four times. In total, on a 10,000 computers network, this task should be completed in about 10 months. In a distributed work, that network requires a bandwidth of about 1.35 Mbyte/Second. This is feasible computation over the internet for example.

Note that increasing the available data decreases the other requirements dramatically. If we had 5 minutes of such data, which is 37.5 times data than 8 seconds, then $D=2^{13}$, only about 44 Hard-Disks of 200 MBs need to be used in total, that is about $M=2^{37}$, and the time would be $T=2^{28}$, which takes about 5 minutes to compute on a single PC. This means that the attack carries out in real-time, but only one of few thousand of frames is a frame that lets the attack succeed.

When a frame is encountered, the attack finds out almost instantaneously if this frame is indeed "the right one" or not.

The attack requires $2^{14}$ random disk accesses, which take about 81 seconds, but are done on 44 hard-disks in parallel, which takes in total about 1.86 seconds, which are spent in the background of the computation. The precomputation is reduced to $N/D=2^{51}$ evaluations of f( ), which takes about $2^{31}$ seconds, or about 3 months on a network of 1000 personal computers.

If 1 Hour of such data is allowed, only about 270 GB of memory is needed, which can be stored on one or two hard-disks, The actual attack time takes about one hour on one personal computer, which means it's actually real-time, the hard-disk access time is about 5 minutes which is negligible. The precomputation can be completed on a network of 40 PCs in about 10 months.

Even if A5/2 is not used anymore in GSM networks, but A5/1 remains, this direct attack on A5/1 can be used to leverage an attack on GPRS, using the fact that their key is created with the same mechanism (i.e., A3A8), and therefore, when given the same input (i.e. RAND and $K_i$) the output which is the resulting key, is the same. This is an example, which can occur in other ciphers, as long as two ciphers share the same key agreement, and an active attack can be mounted more easily on one of these ciphers.

Briceno discovered that many GSM networks use only 54 bits out of the 64 bits of key, setting 10 key bits to 0. Prior art did not take advantage of this fact when employing cryptanalysis. We observe, that when bits are set to a constant value, the direct A5/1 attack can be dramatically improved. As N decreased from $2^{64}$ to $2^{54}$. Only 54 bits of output need to be considered out of f( ). Therefore, each memory line is now only 54 times 2 bits long=13.5 bytes, let's assume 14 bytes.

On the tradeoff curve, $N^2=D^2M^2T$, $T>D^2$, and $N=2^{54}$, consider the example we showed above, where $D=2^8$ which is about 8 seconds of off-the-air data, but now $M=2^{33}$, which is about 500 GB, can be stored on three hard-disks of 200 GB. $T=2^{26}$, this takes only about one minute of computation on a SINGLE PC! This computation can be done in paralleled on a few computers reaching a real-time direct attack on A5/1. The one-time pre-computation takes $N/D=2^{46}$, which is about 3100 computer-days in total, which can be computed on a network of 10 PCs in about 10 months.

Leveraging the Attack to Networks that Require A5/1 or A5/3 but Settle for Less

Some networks may prefer the mobile phone to work with A5/1, but if not possible work with A5/2. When a mobile phone accesses the network, it tells the network what is its capabilities, including which encryption algorithm it can use. A simple classmark attack would be to change the information that the network gets, so it thinks that the phone can work in either A5/2 or A5/0. If the network settles for encryption with A5/2, then the encryption keys can be found using the above detailed method. A similar classmark attack could be mounted when the network prefers A5/3 but settles for less (either A5/1 or A5/2).

Leveraging the Attacks to any GSM Network Method

The attack shown in "An Instant Ciphertext Only Attack on A5/2 Method" assumes that the encryption algorithm is A5/2. Using that attack it is easy to recover $K_c$ in real-time from a few tens of milliseconds of ciphertext.

We ask the question, what happens when the encryption algorithm is not A5/2, but rather is A5/1 or the newly chosen A5/3 or even GPRS. The surprising answer is that almost the same attack applies. All that is needed for the new attack to succeed is that the mobile handset supports A5/2, but this is actually a mandatory GSM requirement to enable roaming to networks that use A5/2.

The following attack retrieves the encryption key that the network uses when A5/1 or A5/3 is employed. The key is discovered by a man in the middle attack on the victim customer. In this attack, the attacker plays two roles. He impersonates the network, as far as the customer sees, and impersonates the customer, as far as the network sees. Note that this kind of an attack is relatively very easy to mount in a cellular environment.

During the initialization of a conversation, the network can send the authentication request to the attacker, the attacker sends it to the victim. The victim computes SRES and return it to the attacker, which sends it back to the network. Now the attacker is "authenticated" to the network. Next, the network asks the customer to start encrypting with A5/1.

In our attack, since the attacker impersonates the customer, the network will actually ask the attacker to start encrypting with A5/1. The attacker does not have the key, yet, and therefore, is not able to start the encryption. The attacker needs the key before he is asked to use it. To achieve it, the attacker asks the victim to encrypt with A5/2 just after the victim returned the SRES, and before the attacker returns the authentication information to the network.

This request looks to the victim as a legitimate request, since the victim sees the attacker as the network. Then, the attacker employs cryptanalysis to retrieve the encryption key of the A5/2 that is used by the victim. Only then, the attacker sends the authentication information to the network. The key only depends on RAND, that means that the key recovered through the A5/2 attack is the same key to be used when A5/1 is used or even when 64-bit A5/3 is used! Now the attacker can encrypt/decrypt with A5/1 or A5/3 using this key.

One may suspect that the network may identify this attack, by identifying a small delay in the time it takes to the authentication procedure to complete. However, GSM standard allows 12 seconds for the mobile to complete his authentication calculations and return an answer. The delay incurred by this attack is less than a second. Also, GSM signaling messages can normally take some time to travel between the network and mobile, due to layer 2 protocol delay. In total, there is a delay but it is negligible.

Many networks initiate the authentication procedure rarely, and use the key created in the last authentication that is saved in customer's SIM. This key is numbered by the network with a number in the range of zero to six. An attacker can discover these stored keys by impersonating the network to the victim mobile. Then the attacker initiates a radio-session with the victim, and asks the victim mobile to start encrypting using algorithm A5/2 and the relevant key number. The attacker then employs the attack and recovers the key and then ends the radio session. The owner of the mobile and the network will have no indication of the attack.

One may wonder if the network operator can discover the attack because the attack transmits, and interface can be caused. While this is generally true, both of these attacks require less transmission than might be expected at first view. In the first one, it might seem that the attacker needs to transmit during the whole conversation time. However, after the first second of communication the attacker already has the encryption key and does not really need to continue the active man in the middle attack.

An attacker might want to stop the active attack, let the network and the victim continue communicating, and tap the encrypted conversation using the key he had discovered. The first step in doing that, is changing the cipher that the victim uses to suit the network's requirements. The attacker should ask the victim to change cipher to no cipher, and then to change to the cipher that is used by the network, i.e., A5/1. An attacker might cause the network to order a handover of the conversation to another frequency. At the same time, the attacker requests the mobile victim to perform a handover to the same frequency.

Note that GSM does not really transmit on a single frequency. Rather, GSM employs a frequency hopping scheme. For simplicity we relate to a certain hopping sequence as a single frequency. This has no implications on the attacks we present. In most GSM conversations, a handover is initiated by the network shortly after the beginning of the conversation. Since it happens anyway it saves the attacker the need to "cause" the network to order a handover. In such a way, the attacker can stop its transmission, while still being able to eavesdrop to the conversation. In the second scenario, the attacker attacks in the time he chooses, and the whole attack can be completed in a few seconds at most. When these keys are in later use, the attacker does not need to perform any transmission.

In the scenarios that are described below, an attack is shown in which the attacker can tap any conversation, while transmitting only for a short duration at a later time of his choosing, possibly after the call has been completed.

The leveraging of the attack relies on the fact that the same key is loaded to A5/2 and A5/1 and even to 64-bit A5/3 (in the scenario where A5/3 is used in GSM, according to GSM standards). Thus, discovering the key for A5/2 reveals the key for A5/1 and 64-bit A5/3.

This attack also applies to GPRS, due to similar reasons. When the network challenges the mobile for a new GPRS key, using a random 128-bit value RAND, the attacker can use "man-in-the-middle" and initiate radio session with the victim, initiate authentication request using the same RAND value, and then ask him to encrypt with A5/2. Then find the key using the ciphertext-only attack that we present. The key that is recovered will be the same as the GPRS key, that is due to the fact that they are both created using the same A3A8 algorithm, and the same $K_j$, therefore, when given the same RAND the same session key is produced.

The attacker can refrain from a "man-in-the-middle" attack, and record the GPRS communication and then later decrypt it using a similar attack, in which he asks the victim for authentication with the same RAND that was used in the session, and then asking the victim to encrypt with A5/2 and recover the key. Even if GPRS changes the key several times using a new RAND, each time the attacker recorded the communications and the RAND he can repeat this process later in the attack against the victim, find the key and decrypt the communications. These attacks can be used for impersonation, in a similar way. Note that, although A5/3 can be used with key lengths of 64-128 bits, the GSM standard allows the use of only 64-bit A5/3.

Unfortunate Consequence Scenarios for GSM

The presented attacks can be used to emulate real life attacks in several scenarios. In this section four examples are presented. These attacks work for various encryption algorithm that may be used, for example: A5/1, A5/2 or A5/3, and even GPRS.

Call Wire-Tapping Attack

A simple scenario that one might anticipate is eavesdropping conversations. Communications that are encrypted using GSM can be decrypted and eavesdropped by an attacker, once the attacker has the encryption key. Both voice conversations and data, for example SMS messages, can be wire-tapped.

Another possible wire-tapping attack, is that the attacker records the encrypted conversation. The attacker must make sure that it knows the RAND value that created the key that is in use. At a later time, when it's convenient for the attacker, the attacker impersonates the network to the victim. Then the attacker initiates a radio-session, ask the victim to perform authentication with the above RAAD, and recover the session key that was used in the recorded conversation. Once the attacker has the key he simply decrypts the conversation and can listen to its contents.

Note that an attacker can record many conversations and, with subsequent later attacks, recover all the keys. This attack has the advantage of transmitting only in the time that is convenient for the attacker. Possibly even years after the recording of the conversation, or when the victim is in another country, or in a convenient place for the attacker.

Another attack is finding the key before the conversation by finding the stored key as we described. Finding the key before the conversation is effective, if the network does not ask the subscriber to perform authentication with a different RAND in the beginning of the conversation.

Call Hijacking Attack

While a GSM network can perform authentication at the initiation of the call, encryption is the means of GSM for preventing impersonation at later stages of the conversation. The underlying assumption is that an imposter would not have $K_c$, and thus would not be able to conduct encrypted communications. It is shown how to obtain encryption keys. Once an attacker has the encryption keys, he can cut the victim off the conversation, and impersonate the victim to the other party. Therefore, hijacking the conversation after authentication is possible.

Some people may claim that it would be difficult to apply this attack in practice, due to the difficulty in transmitting the required data on the air. It is stressed that impersonation is an attack that is relatively easy to mount in a cellular environment. The GSM transmission is carried over radio frequency, which makes these types of attack very easy to perform and difficult to detect. For example, an attacker might make sure that his signal is received at the cell's antenna with a much higher power than the victim's signal. The attacker can also cause disturbance by making sure that a noise signal is received in high power in the antenna of the victim.

The hijacking can occur during the early call-setup, even before the victim's phone begins to ring. The operator can hardly suspect there is an attack. The only clue of an attack is a moment of some increased electromagnetic interface.

Another way to hijack incoming calls, is to mount a kind of a "man in the middle" attack, but instead of forwarding the call to the victim, the attacker receives the call.

Altering of Data Messages (SMS) Attack

Once a call has been hijacked, the attacker decides on the content. The attacker can listen to the contents of a message being sent by the victim, and send his own version. The attacker can stop the message, or send his own SMS message. This compromises the integrity of GSM traffic.

Call Theft Attack

GSM was believed to be secure against call theft, due to authentication procedures of A3A8.

However, due to the mentioned weaknesses, an attacker can make outgoing calls at a victim's expense. When the network asks for authentication, then a man in the middle attack, similar to the one that we described in leveraging the attack to any GSM Network would succeed. The attacker initiates in parallel an outgoing call to the cellular network, and a radio session to a victim. When the network asks the attacker for authentication, the attacker asks the victim for authentication, and relays the resulting authentication back to the network.

The attacker can also recover $K_c$ as described in the present disclosure. Now the attacker can close the radio session with the victim, and continue the outgoing call as regular. This attack is hardly detectable by the network, as it views it as normal access. The victim's phone will not ring, and the victim will have no indication that he/she is a victim. At least until his/her monthly bill arrives.

Various other embodiments of attack methods will occur to persons skilled in the art upon reading the present disclosure. The above detailed methods can be further expanded, for example:

1. A cryptanalysis method comprising
   A. Requesting a phone to encrypt with A5/2;
   B. Using the results to decrypt communications which is encrypted with A5/2, A5/1 A5/3 or GPRS. Thus, an attacker affects the decision regarding the encryption method to be used, in this case in a way that facilitates its subsequent decryption.

2. A cryptanalysis classmark attack method comprising:
   A. the attacker causes the network to decide that the phone is not able to encrypt with A5/1 but just with A5/2;
   B. this enabling the attacker to use the attack and decrypt communications 3. A cryptanalysis method comprising:
   A. Performing a ciphertext-only direct cryptanalysis of A5/1;
   B. Using results of Step (A) to facilitate the decryption and/or encryption of further communications that are consistent with encryption using the session key and/or decryption using the session key.

In the above method, the cryptanalysis may consider part of the bits of the session key to have a known fixed value.

The cryptanalysis may also find the session key.

4. A cryptanalysis method comprising:
   A. performing a ciphertext-only direct cryptanalysis of A5/2;
   B. Using results of Step (A) to facilitate the decryption and/or encryption of further communications that are consistent with encryption using the session key and/or decryption using the session key.

In the above cryptanalysis method, the cryptanalysis may consider part of the bits of the session key to have a known fixed value.

Furthermore, the cryptanalysis method may also find the session key.

5. A method for protecting GSM communications comprising performing repeatedly GSM authentication during an on-going session.

In the above method to protect GSM communications, the ciphering key may also be changed as a result of applying the GSM authentication procedure.

Furthermore, an attacker may emit radio frequency transmissions.

The above GSM active cryptanalysis methods may also include:
   A. the attacker's transmission causes the network to decide that the phone's classmark is such that the phone is not able to encrypt with A5/1 but just with A5/2;
   B. this causes the network to request encryption only with A5/2, enabling the attacker to use the attack and decrypt communications.

The above GSM active cryptanalysis methods may also include:
   A. the attacker's transmission causes the network to decide that the phone's classmark is such that the phone is not able to encrypt with A5/3 but just with A5/2 or A5/1;
   B. this causes the network to request encryption only with A5/1, enabling the attacker to use the attack and decrypt communications.

The above GSM active cryptanalysis methods may also include:
   A. The attacker's transmission causes the phone to decide that the transmission originated from the network, and requests the phone to encrypt with A5/2;
   B. The phone replies with data that is encrypted with A5/2;
   C. Using the session key that results from the cryptanalysis to decrypt and/or encrypt communications on the wireless link between the attacker and the phone, and/or decrypt and/or encrypt communications on the wireless link between the attacker and the network, which is encrypted with A5/2, A5/1, A5/3 or GPRS, and/or decrypt and/or encrypt communications on the wireless link between the phone and the network, which is encrypted with A5/2, A5/1, AS/3 or GPRS.

The above GSM active cryptanalysis methods may also include:
   A. The attacker's transmission causes the phone to decide that the transmission originated from the network, and requests the phone to encrypt with A5/1;
   B. The phone replies with data that is encrypted with A5/1;
   C. Using the session key that results from the cryptanalysis to decrypt and/or encrypt communications on the wireless link between the attacker and the phone, and/or decrypt and/or encrypt communications on the wireless link between the attacker and the network, which is encrypted with A5/2, A5/1, A5/3 or GPRS, and/or decrypt and/or encrypt communications on the wireless link between the phone and the network, which is encrypted with A5/2, AS/1, A5/3 or GPRS.

In the above cryptanalysis method, the Ciphertext-Only cryptanalysis may comprise:
   A. Performing an efficient known plaintext attack on A5/1 that recovers the session key;
   B. Improving the known plaintext attack to a ciphertext only attack on A5/1.

Improvements in GSM Network Method and System

Various improvements in cellular systems will occur to persons skilled in the art upon reading the possible novel attack methods detailed in the present disclosure.

Examples Relating to GSM Include:

1. GSM operators should replace the cryptographic algorithms and protocols now in use as early as possible, to protect the privacy of their customers.

2. Even GSM networks using the new A5/3 succumb to the attack presented here, in the way that A5/3 is at present integrated into GSM. Accordingly, it is suggested to make changes in the way A5/3 is integrated to protect the networks from such attacks. A possible correction is to make the keys used in AS/1 and A5/2 unrelated to the keys that are used in A5/3. This change should also be made in GPRS. In general, it is preferable to create unrelated keys for different encryptions, so that a weakness in one of them would be able to inflict on the others.

3. Even if GSM implements larger key sizes for A5/3, the trivial way for GSM to implement it, is to use the same first bits of the key to AS/1 and A5/2, and have some additional key bits added. Such implementation will cause our attack to easily discover 64 key bits of the key that is used in A5/3, thus reducing security considerably.

4. The present ciphertext-only attack is facilitated by the fact that the error-correction codes are now employed before the encryption. In the case of GSM, the addition of such a structured redundancy before the encryption is performed, fatally reduces the system's security. A method and structure to correct this flaw is proposed.

5. Modifying the GSM standard, to allow the use of more than 64-bit A5/3, would deliver a higher security, and limit the effectiveness of the attack.

6. Performing authentication more often, even during an on-going session, may prove to be a good protection. It would prove that the "real" subscriber is still the one on the other side of the channel. Also authentication in GSM changes the key, which would force an eavesdropper to perform the attack from the start. Even if the key is not changed during the conversation, it will still ensure that there is no impersonation.

7. Stop the use of A5/2, especially in phones. Stopping the use of A5/2, would leave the direct attack on A5/1, which is more expensive and difficult to perform. The attack against A5/1 could still be leveraged against GPRS (like the A5/2 attack), but the cost would be much higher to perform. The down side of this change, that it would force upgrading the infrastructure in networks that employ A5/2. An other option is to create series of phones that do not support A5/2. They will be have no encryption when roaming to A5/2 networks (but as we show A5/2 is not secure anyhow), but will increased security in A5/1 or A5/3 networks, since the A5/2 attack would not work.

Therefore, the direct A5/1 would have to be employed, and this attack is far more expensive and difficult to perform.

8. Use more of the available bits for encryption, i.e., use the full 64 bits of key available. In future, as more bits may be available—more bits may be used.

It will be recognized that the foregoing is but one example of an apparatus and method within the scope of the present invention and that various modifications will occur to those skilled in the art upon reading the disclosure set forth hereinbefore.

The invention claimed is:

1. A system for decrypting an encrypted cellular digital communication transmitted to or by a tranceiver of a client device, said system comprising:
communication circuitry configured to receive the encrypted cellular digital communication, wherein the encrypted digital communication is encrypted according to a given encryption algorithm which employs an XORing of bits of digital communication with a keystream generated from an encryption key to generate the encrypted digital communication, and the digital communication is characterized by a given error correction coding scheme employed prior to encryption, where the error correction coding is based on a binary matrix associated with a characterized linear redundancy data streams generated using a convolutional error correction coding;
processing circuitry configured to recover the encryption key from the encrypted cellular digital communication with a recovery process of the encryption key that comprises deriving equations based on redundancy introduced by the error correction coding and using an XORing function over data bits of the encrypted cellular digital communication.

2. The system according to claim 1, wherein the encrypted digital communication is a wireless communication and said communication circuitry is wireless communication circuitry.

3. The system according to claim 2, wherein the encrypted digital communication is a cellular communication.

4. The system according to claim 3, wherein the encrypted digital communication is a GSM communication.

5. The system according to claim 4, wherein the encrypted digital communication is a text message.

6. A system for decrypting an encrypted cellular digital communication transmitted to or by a tranceiver of a client device, said system comprising:
communication circuitry configured to receive the encrypted cellular digital communication, wherein the encrypted digital communication is encrypted according to a given encryption algorithm which employs an XORing of bits of digital communication with a keystream generated from an encryption key to generate the encrypted digital communication, and the digital communication is characterized by a given error correction coding scheme employed prior to encryption, where the error correction coding is based on a binary matrix associated with a characterized linear redundancy data streams generated using a convolutional error correction coding;
processing circuitry adapted to recover an encryption key used to encrypt the encrypted digital communication by deriving equations over bit-streams of the encrypted digital communication, based on a structured redundancy characterizing data streams generated using the given error correction coding and using an XORing function over data bits of the encrypted cellular digital communication.

7. The system according to claim 6, wherein the encrypted digital communication is a wireless communication and said communication circuitry is wireless communication circuitry.

8. The system according to claim 7, wherein the encrypted digital communication is a cellular communication.

9. The system according to claim 8, wherein the encrypted digital communication is a GSM communication.

10. The system according to claim 9, wherein the encrypted digital communication is a text message.

11. A system for decrypting an encrypted cellular digital communication transmitted to or by a tranceiver of a client device, said system comprising:
communication circuitry adapted to receive the encrypted cellular digital communication, encrypted according to a given encryption algorithm characterized by a given error correction coding which employs an XORing of bits of digital communication with a keystream generated from an encryption key to generate the encrypted digital communication;
processing circuitry adapted to recover an encryption key used to encrypt the encrypted digital communication by:
  (i) performing a decryption process of the encrypted digital communication using a candidate encryption key and wherein the encrypted digital communication is encrypted according to a given encryption algorithm which employs an XORing of bits of digital communication with a keystream generated from an encryption key to generate the encrypted digital communication;

(ii) mathematically searching for patterns within an output of the decryption process matching a structural redundancy typical of the given error correction coding; and (iii) repeating steps (i) & (ii) with different candidate encryption keys until a candidate encryption key producing a pattern typical of the given error correction coding is found.

12. The system according to claim 11, wherein the encrypted digital communication is a wireless communication and said communication circuitry is wireless communication circuitry.

13. The system according to claim 12, wherein the encrypted digital communication is a cellular communication.

14. The system according to claim 13, wherein the encrypted digital communication is a GSM communication.

15. The system according to claim 14, wherein the encrypted digital communication is a text message.

\* \* \* \* \*